Jan. 8, 1952          E. MANN          2,581,546

TUBULAR ELECTRIC DISCHARGE LAMP UNIT

Filed April 27, 1946

INVENTOR:
ERNO MANN,
BY John H. Anderson
HIS ATTORNEY

Patented Jan. 8, 1952

2,581,546

UNITED STATES PATENT OFFICE 2,581,546

TUBULAR ELECTRIC DISCHARGE LAMP UNIT

Ernö Mann, Eindhoven, Netherlands, assignor, by mesne assignments, to Hartford National Bank and Trust Company, as trustee Application April 27, 1946, Serial No. 665,398
In the Netherlands October 29, 1942

Section 1, Public Law 690, August 8, 1946
Patent expires October 29, 1962

2 Claims. (Cl. 315—100)

1

This invention relates to a device comprising a gas and/or vapor-filled electric discharge tube which for the purpose of being put into use has each of its ends introduced into a tube holder. In addition, the invention relates to a discharge tube for use in such a device.

The most customary type of these discharge tubes is the low-pressure mercury-vapour discharge tube, whose discharge vessel has luminescent substances applied in or on it. This tubular discharge vessel, which is generally entirely straight, may have a considerable length, for example 1 metre and upwards, so that the instalment of the tube must be effected by means of two tube holders. Apart from the instalment of the auxiliary appliances for the ignition and the operation of such a tube the instalment of the device requires the laying of current leads between the two tube holders; for this purpose the wall to which the tube is secured for example has formed in it between the tube holders a channel in which the current leads are housed.

The invention has for its object to simplify the instalment of the tube.

According to the invention, one of the tube holders is arranged to be connected to a source of current and the conductors that connect the other tube holder to the tube holder capable of being connected are united with the discharge tube to form a single unit. Consequently, there is no need for current leads to be arranged between the two tube holders in or on the wall or other base on which the tube is installed; the electric connection between the two tube holders is established on the discharge tube being introduced into the holders. The instalment of the device is thus much simplified. A further simplification is ensured if all the auxiliary devices or equipment necessary for the ignition and operation of the tube or part of them are housed in either of the tube holders or in both. The discharge tube to be used in such a device is characterized in that it contains at least one conductor which is connected to two contact members placed at different ends of the tube and which is insulated with respect to at least one of the electrodes of the tube.

In order that invention may be clearly understood and readily carried into effect it will now be described more fully with reference to the accompanying drawing, in which two embodiments are diagrammatically shown.

Figure 1:
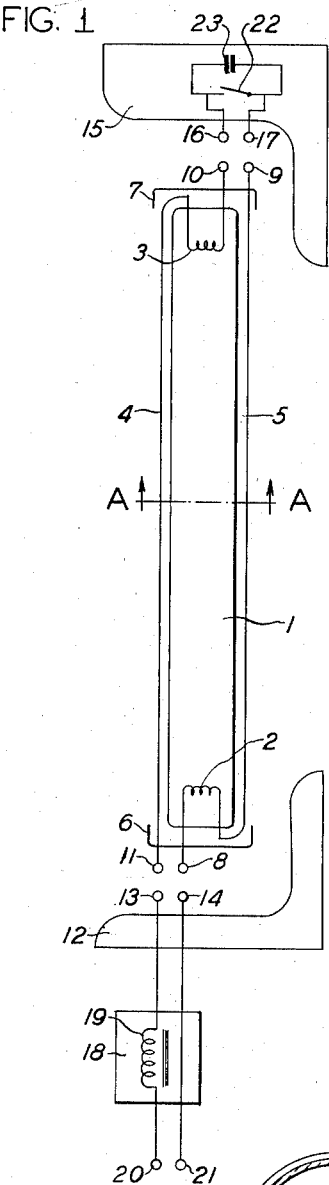

The device shown in Figure 1 contains a luminous elongated straight discharge tube or lamp 1, which may be for example a low-pressure

2 mercury-vapour discharge tube, whose tube wall is internally coated with powder that becomes luminescent under the action of the rays generated in the discharge. The tube 1 comprises incandescent electrodes 2 and 3 placed respectively at the ends and two conductors 4 and 5 placed in position along the exterior of the wall. The tube ends are covered by two caps 6 and 7 which are attached to the tube for example by cemeting and are provided with several contact members. The conductor 5 is connected to the contact member 9 of the cap 7 and is otherwise connected through the incandescent electrode 2 to the contact member 8 of the cap 6. Similarly, the conductor 4 is connected to the contact member 11 of the cap 6 and on the other hand through the incandescent electrode 3 to the contact member 10 of the cap 7.

The cap 6 is held in a lamp-holder 12 provided with contact members 13 and 14, which correspond with the contact members 11 and 8 of the cap 6. The cap 7 is held in the lamp-holder 15. This lamp-holder is provided with two contact members 16 and 17, which make contact with the members 10 and 9 of the cap 7. For simplicity the construction of the caps and lamp-holders is not shown in detail in Figure 1 and the contact members of the caps as well as those of the lamp-holders are shown slightly spaced apart. By means of two conductors leading to the contact members 13 and 14 the lamp-holder 12 is connected to a small box 18 containing a choke coil 19. The box 18 is provided in addition with two connecting members or terminals 20 and 21 for connection to a source of current, for example an alternating-current supply of 220 volts and 50 cycles. The holder 15 contains a switch 22, for example a small glow-discharge tube having at least one electrode fitted on a bimetallic strip, and a condenser 23 connected in parallel therewith. The current interruptor 22 and the condenser 23 may also be arranged externally of the holder 15.

On the device being put under tension and the switch 22 being closed a heavy current passes through the choke coil 19, the contacts 13 and 11, the conductor 4, the electrode 3, the contacts 10 and 16, the switch 22, the contacts 17 and 9, the conductor 5, the electrode 2 and the contacts 8 and 14. This makes the electrodes 2 and 3 rapidly assume the emission temperature; after this the switch interrupts the connection between the electrodes in a well-known manner so that the tube can be started up and this is assisted by a voltage pulse which on interruption of the circuit is supplied by the choke coil 9. The condenser 23 acts as a radio-interference neutralizing member.

The lamp-holders 12 and 15 are secured for example to the wall of a living room. The box 18 is housed as usual in the wall, preferably in the proximity of the lamp-holder 12. As may be clearly seen, there is no electric connection external of the tube between the widely spaced lamp-holders 12 and 15 so that there is no need for the latter to be placed in the wall or in an insulating tube that disfigures the room.

Figure 1A:
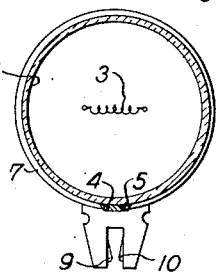

The caps 6 and 7 are symmetrical and identical so that in installing the tube in the holders there is no need to have regard to a definite position of the tube: the tube may unobjectionally be rotated by 180° about its longitudinal axis and the cap 6 may also be inserted in the holder 15 and the cap 7 in the holder 12. In doing so, the conductors 4 and 5 may be so secured to the tube as to be placed laterally of the tube when the latter is introduced into the holders. The attachment of the conductors 4 and 5 to the tube wall may be effected for example by means of a glass having a low melting point or a synthetic resin, preferably transparent, and so forth. It is thus possible to reduce the loss of light to a negligible value. The instalment of the conductors 4 and 5 may be effected prior to the application of the luminescent layer in the tube so that during any heat treatment that may be necessary during the instalment of the conductors 4 and 5 the luminescent layer cannot be affected detrimentally. The caps 6, 7 and the tube holders 12, 15 may be so constructed according to a method frequently employed that the contact members 8, 9, 10 and 11 of the tube are placed laterally of the caps. In this case, the conductors 4 and 5 may preferably be arranged on that side of the tube wall where the contact members are arranged so that they will be adjacent the wall. This case is shown in Figure 1a which is a cross-sectional view of the tube taken on the line A—A.

The conductors 4 and 5 may also be arranged on the inner wall of the tube or in the tube wall. Under certain conditions a single conductor may suffice; on the other hand more than two conductors are required in certain circuit arrangements. These conductors must be connected to two contact members at different ends of the tube.

The presence of the conductors 4 and 5 on the tube wall has the additional advantage of assisting the ignition and these conductors also contribute to suppressing radio disturbances brought about by the discharge.

Figure 2:
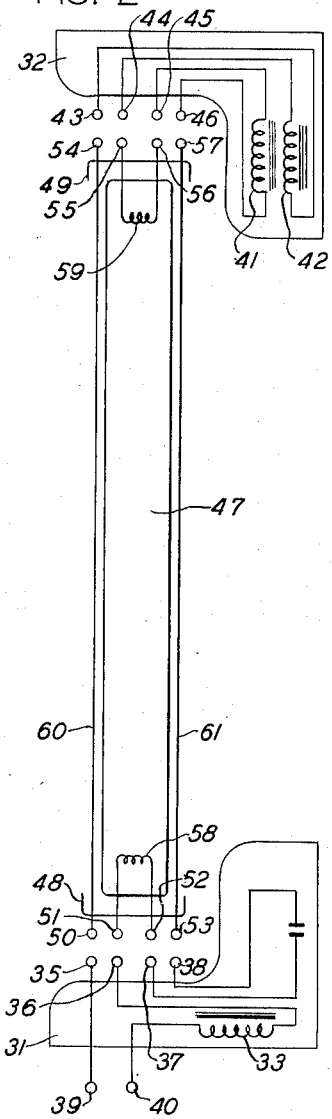

Figure 2 shows a device in which all the series-connecting and operating elements are housed in the lamp-holders 31 and 32. The holder 31 contains a choke coil 33, a condenser 34, four contact members 35, 36, 37, 38 and current conductors which terminate in connecting members 39 and 40. In this case, the connecting member 39 is connected to the contact member 35 and the connecting member 40 through the choke coil 33 to the contact member 36. The condenser 34 is arranged between the contact members 37 and 38.

The holder 32 contains a choke coil having two windings 41 and 42 and four contact members 43, 44, 45 and 46. The winding 41 is connected to the contact members 45 and 46 and the winding 42 is connected to the contact members 43 and 44.

The discharge tube 47, which for example may also be a low-pressure mercury vapour discharge tube, is provided at each end with a cap 48 or 49 respectively, with four contact members 50, 51, 52 and 53 or 54, 55, 56 and 57 respectively. These members act to make contact with the corresponding members of the lamp-holders. The contact members 51 and 52 or 55 and 56 have connected between them an incandescent electrode 58 or 59 of the discharge tube. The outer wall of this tube supports two conductors 60 and 61. The conductor 60 terminates in the contact members 50 and 54, whereas the conductor 61 is connected to the contact members 53 and 57.

On connection of the device to a source of alternating current a current passes through the conductor 60, the winding 42, the electrode 59, the winding 41, the conductor 61, the condenser 34, the electrode 58 and the choke coil 33. Owing to the fact that the choke coil windings 41 and 42 are wound in such manner that the resulting magnetic field is very feeble and the choke coil 33 and the condenser 34 are so proportioned that their resistance values are substantially identical, the said current is very high and a high resonance voltage occurs between the electrodes of the lamp. The electrodes 58 and 59 are thus rapidly heated and the tube is started up under the action of the said high voltage between the electrodes, after which the current strength goes down to the ordinary operating value.

Again, if the tube is removed, one of the lamp-holders, that is to say the holder 32, is not connected to the source of current supply so that there is no need to house conductors in the wall or in an insulating tube between the widely spaced lamp-holders. In this case, the conductors 60 and 61, each of which is connected to two contact members placed at different ends of the tube are insulated with respect to the two electrodes of the tube.

What I claim is:

1. In combination, a pair of spaced lamp holders one of which is provided with a pair of contacts and a pair of terminals for connection to a power source, each of said contacts connecting to one of said terminals, and the other of which includes a pair of contacts and a starting switch connected across said contacts, the said other holder being free from terminals for connection to the power source, and an elongated gaseous electric discharge lamp having an elongated envelope mounted in said holders and comprising at each end an electrode of the preheated type and a pair of contact prongs extending longitudinally from each end of the lamp engageable with respective contacts of one of the lamp holders and one of which prongs is electrically connected to one end of the adjacent electrode and the other of which prongs is free of such connection, and a pair of conductors integral with and extending along the envelope and each being connected to the free prong at one end of the lamp and to the free end of the electrode at the opposite end of the lamp whereby the lamp is properly connected electrically in any position in which it may be inserted in said lamp holders and said starting switch is electrically connected through said conductors for effecting starting and operation of the lamp.

2. In combination, a pair of spaced lamp holders and an elongated gaseous electric discharge lamp having an elongated envelope mounted in said holders and comprising at each end an electrode of the preheated type and two pairs of contact prongs extending longitudinally from each end of the lamp, and a pair of conductors integral with and extending along the envelope, one of said lamp holders being provided with two pairs of contacts engageable with the contact prongs on the end of the lamp, and one pair of terminals, one pair of contacts connecting through a choke to the pair of terminals for connection to a power source, the other pair of contacts being connected together through a capacitor, the other lamp holder being provided with two pairs of contacts, each pair being connected together through a separate choke, one contact of each pair on each lamp holder engaging a corresponding contact prong on the lamp connecting to the electrode in the lamp, the other contact of each pair connecting to a corresponding contact prong on the lamp which is connected to the corresponding contact prong at the other end of the lamp through one of the conductors on the envelope, whereby the lamp is properly connected electrically in either position in which it may be inserted in said lamp holders and the chokes and capacitor are properly interconnected for effecting starting and operation of the lamp.

ERNÖ MANN.

REFERENCES CITED

The following references are of record in the file of this patent:

UNITED STATES PATENTS

| Number | Name | Date |
|---|---|---|
| 706,314 | Gilmore | Aug. 5, 1902 |
| 2,056,635 | Wiegand | Oct. 6, 1936 |
| 2,273,960 | Hopkins | Feb. 24, 1942 |
| 2,276,829 | De Reamer | Mar. 17, 1942 |
| 2,298,336 | Babb | Oct. 13, 1942 |
| 2,301,670 | Abadie | Nov. 10, 1942 |
| 2,337,745 | Garstang | Dec. 28, 1943 |
| 2,344,122 | Bay | Mar. 14, 1944 |
| 2,369,123 | Abshire | Feb. 13, 1945 |
| 2,448,937 | Walter | Sept. 7, 1948 |